(12) United States Patent
Shih

(10) Patent No.: US 9,643,676 B2
(45) Date of Patent: May 9, 2017

(54) BOTTLE HOLDER FOR BICYCLE

(71) Applicant: Ho-Jen Shih, Changhua (TW)

(72) Inventor: Ho-Jen Shih, Changhua (TW)

(73) Assignee: NUVO ENTERPRISE CO. LTD., Changhua (TW)

( * ) Notice: Subject to any disclaimer, the term of this patent is extended or adjusted under 35 U.S.C. 154(b) by 0 days.

(21) Appl. No.: 14/721,918

(22) Filed: May 26, 2015

(65) Prior Publication Data

US 2016/0101821 A1   Apr. 14, 2016

(30) Foreign Application Priority Data

Oct. 8, 2014   (TW) .............................. 103217945 U

(51) Int. Cl.
*B62J 11/00*   (2006.01)

(52) U.S. Cl.
CPC ...................................... *B62J 11/00* (2013.01)

(58) Field of Classification Search
CPC . B62J 11/00; A45F 2200/0583; B65D 23/106
USPC .................................................. 224/414, 425
See application file for complete search history.

(56) References Cited

U.S. PATENT DOCUMENTS

| 5,607,087 A * | 3/1997 | Wery | B67D 1/0456 |
| | | | 222/401 |
| 6,543,825 B1 * | 4/2003 | Dragutin | B65D 23/106 |
| | | | 215/396 |
| D740,077 S * | 10/2015 | Strepkoff | D7/622 |

* cited by examiner

*Primary Examiner* — Corey Skurdal
(74) *Attorney, Agent, or Firm* — Che-Yang Chen; Law Offices of Scott Warmuth

(57) ABSTRACT

An improved bottle holder may include a supporting board, which has a screw hole configured to connect with a screw to secure the bottle holder on the bicycle, and a lower portion of the supporting board has a supporting piece connecting with an arc-shaped elastic portion on each of both sides of the supporting piece. A limited hole and a through hole partially overlapped with each other are formed on the supporting piece, and the size of the through hole is larger than that of the limited hole, and a protruding edge is formed at a connecting portion of the limited hole and the through hole on each side thereof.

2 Claims, 7 Drawing Sheets

BOTTLE HOLDER FOR BICYCLE

FIELD OF THE INVENTION

The present invention relates to a bottle holder for a bicycle, and more particularly to a bottle holder for a bicycle that can provide a support frame for different sizes of bottles.

BACK GROUND OF THE INVENTION

The bottle holders for bicycle are widely used to carry water bottles with bicyclists. One common type of current bottle holder, which is made of metal, is shaped into a U-shaped frame which may directly be mounted on the bicycle frame, and the water bottle is inserted into the U-shaped frame and held in place by friction.

However, conventional bottle holder for bicycle is disadvantageous because current bottle holder can only be adapted for specific water bottles, and some bottles such as PET bottles are difficult to be secured on the holder and are dropped out of the holder more easily during the riding process. Therefore, there remains a need for a new and improved design for a bottle holder to overcome the problems presented above.

SUMMARY OF THE INVENTION

The present invention provides a bottle holder for a bicycle, which comprises a supporting board. The supporting board has a screw hole configured to connect with a screw to secure the bottle holder on the bicycle, and a lower portion of the supporting board has a supporting piece connecting with an arc-shaped elastic portion on each of both sides of the supporting piece. A limited hole and a through hole partially overlapped with each other are formed on the supporting piece, and the size of the through hole is larger than that of the limited hole, and a protruding edge is formed at a connecting portion of the limited hole and the through hole on each side thereof.

Comparing with conventional bottle holder, the present invention is advantageous because with the design of the limited hole, the through hole, and the protruding edge formed at a connecting portion of the limited hole and the through hole, the bottle holder can be used for the water bottles, including traditional PET bottles, with different sizes. The bottle holder in the present invention can successfully prevent the water bottles with different sizes from falling out of the bottle holder during the riding process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
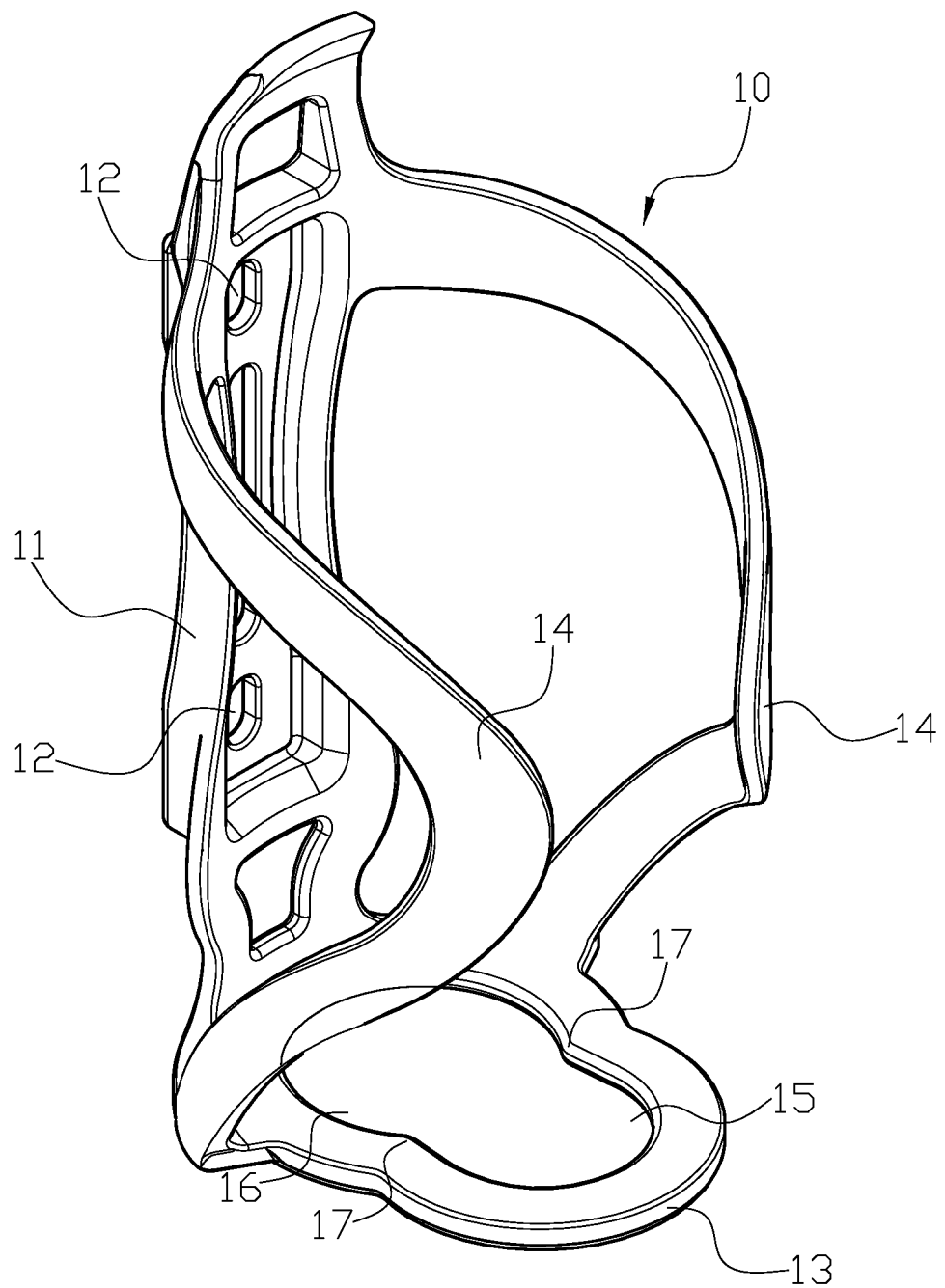
FIG. 1 is a three-dimensional view of the bottle holder in the present invention.
Figure 2:
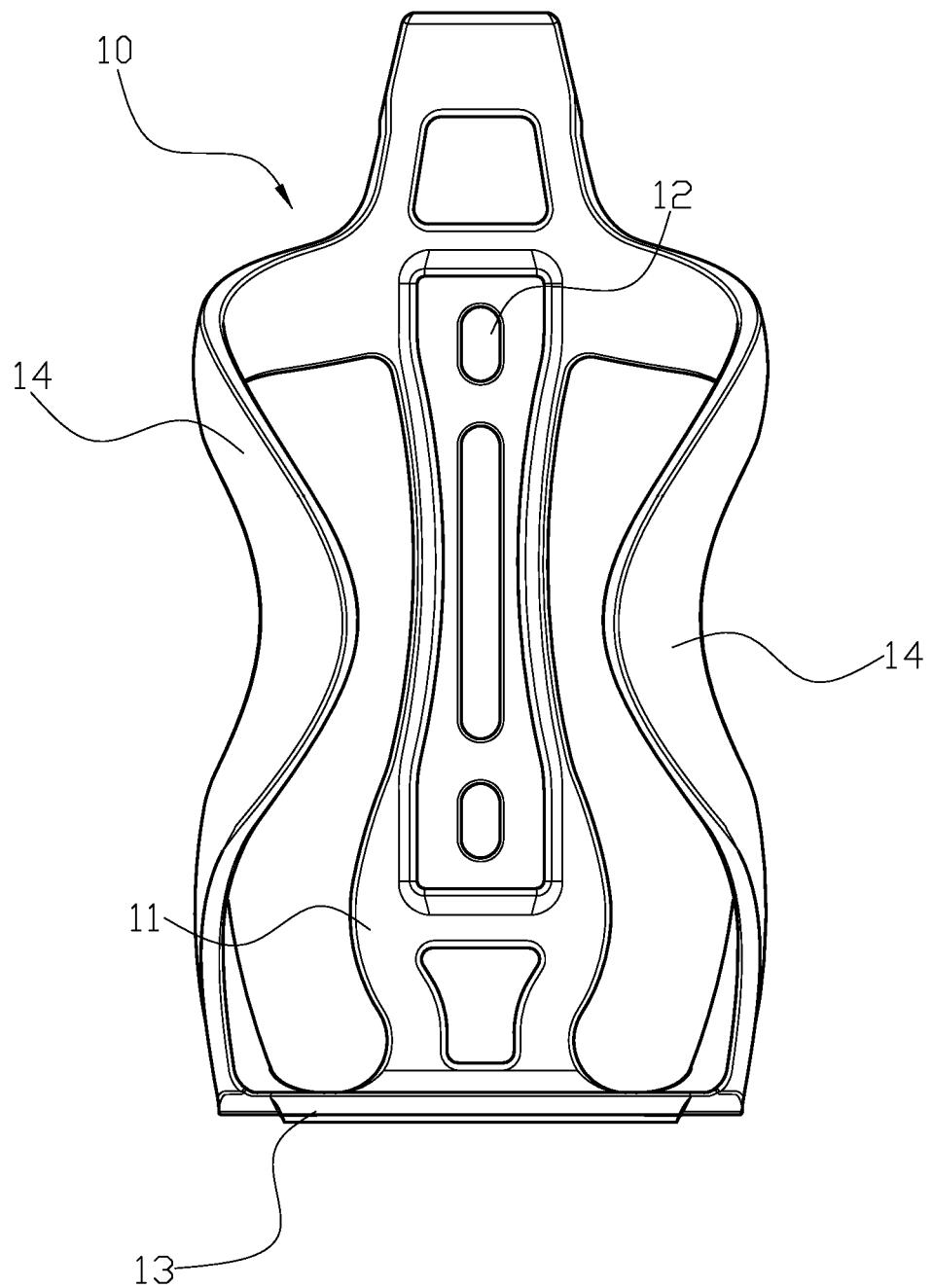
FIG. 2 is a plane view of the bottle holder in the present invention.
Figure 3:
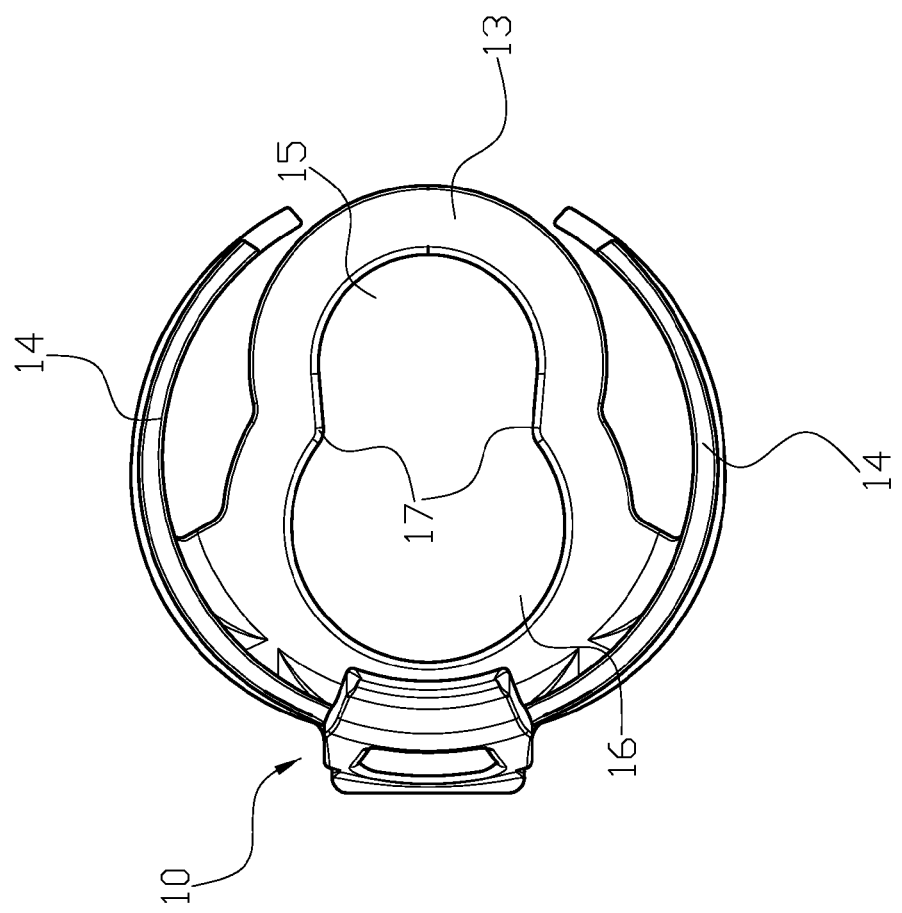
FIG. 3 is a plane view from another angle of the bottle holder in the present invention.

In order to further understand the goal, characteristics and effect of the present invention, a number of embodiments along with the drawings are illustrated as following:

Referring to FIGS. 1 to 3, the present invention provides a bottle holder (10) for a bicycle, which comprises a supporting board (11). The supporting board (11) has a screw hole (12) configured to connect with a screw to secure the bottle holder (10) on the bicycle, and a lower portion of the supporting board (11) has a supporting piece (13) connecting with an arc-shaped elastic portion (14) on each of both sides of the supporting piece. A limited hole (15) and a through hole (16) partially overlapped with each other are formed on the supporting piece (13), and the size of the through hole (16) is larger than that of the limited hole (15), and a protruding edge (17) is formed at a connecting portion of the limited hole (15) and the through hole (16) on each side thereof.

In one embodiment, the screw hole on the support board (11) is rectangular.

Figure 4:
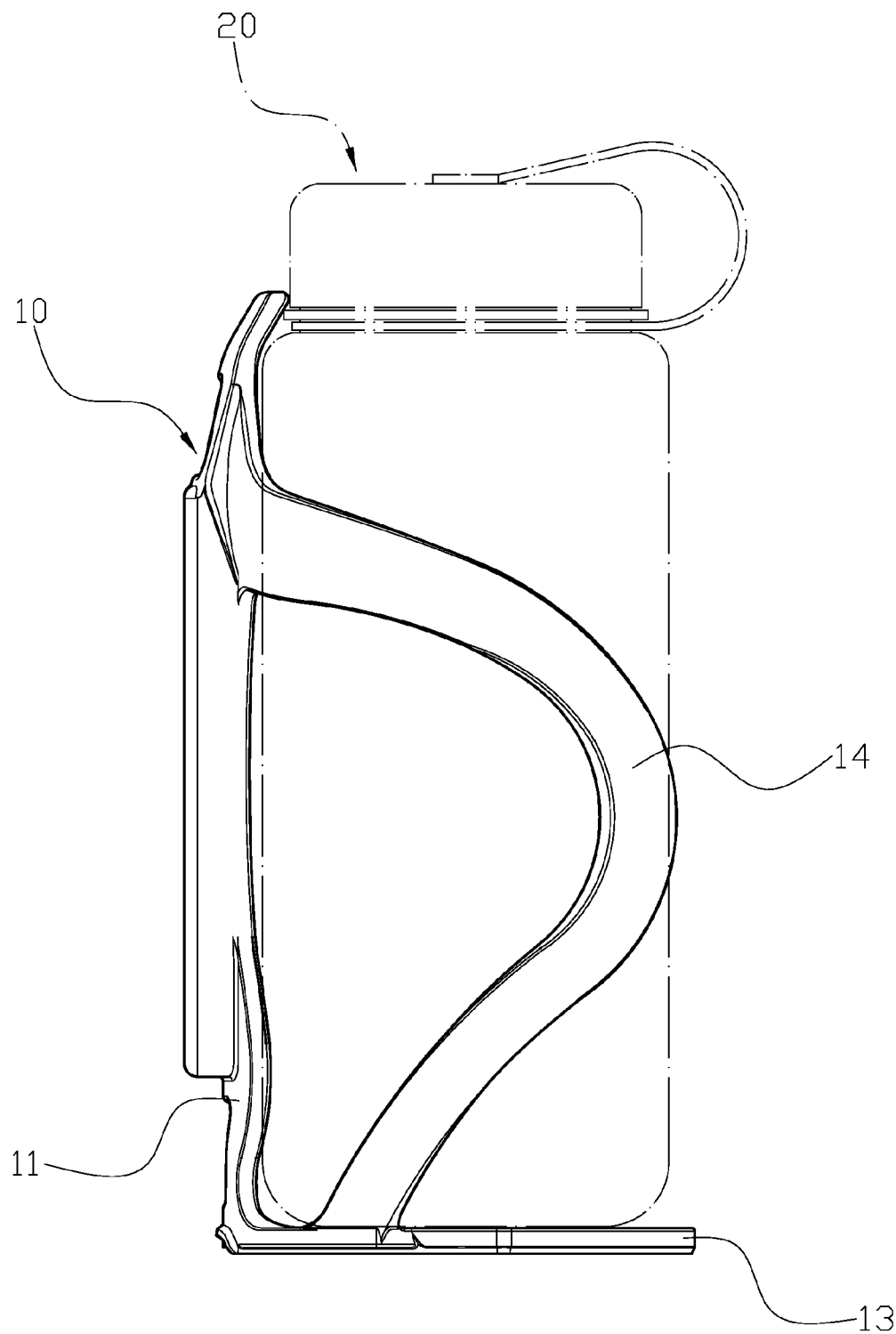
FIG. 4 is a schematic view of the present invention when the water bottle is inserted into the bottle holder.
Figure 5:
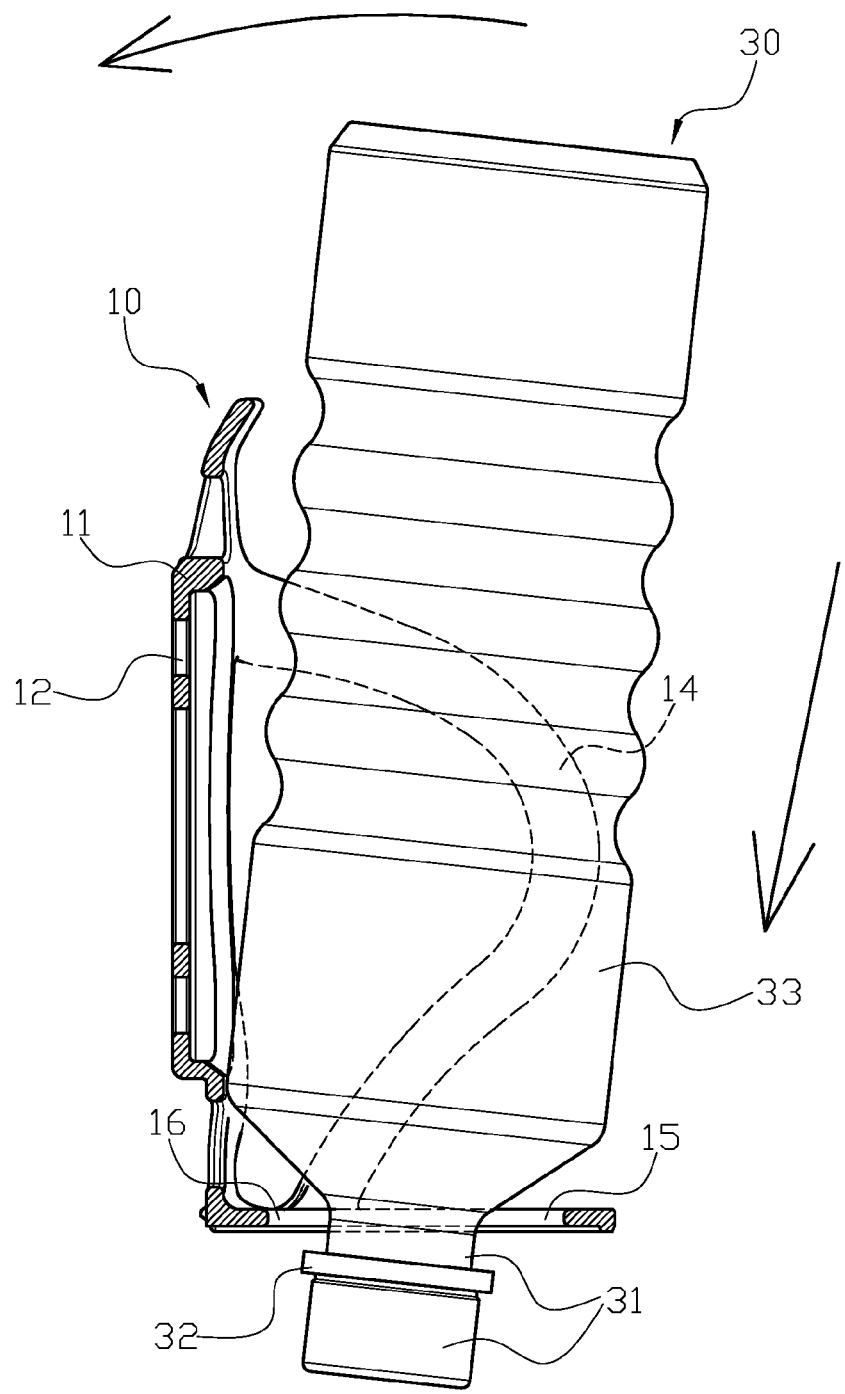
FIG. 5 is a three-dimensional view of the bottle holder of the present invention when the bottle opening portion is inserted into the through hole with an angle and is moved toward the limited hole.
Figure 6:
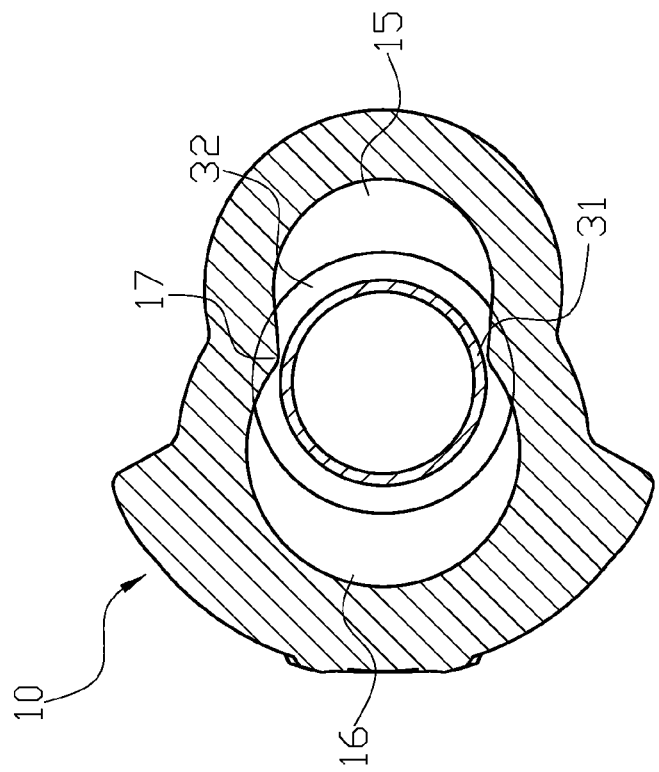
FIG. 6 is a sectional view of the bottle holder of the present invention when the bottle opening portion is inserted into the through hole with an angle and is moved toward the limited hole.
Figure 7:
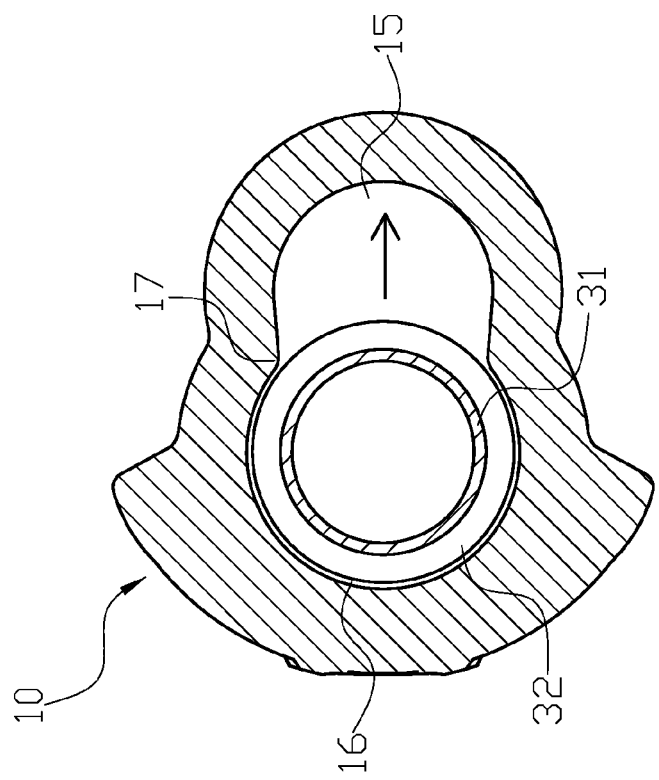
FIG. 7 is a schematic view of the present invention when the PET bottle is secured in the bottle holder.
Figure 8:
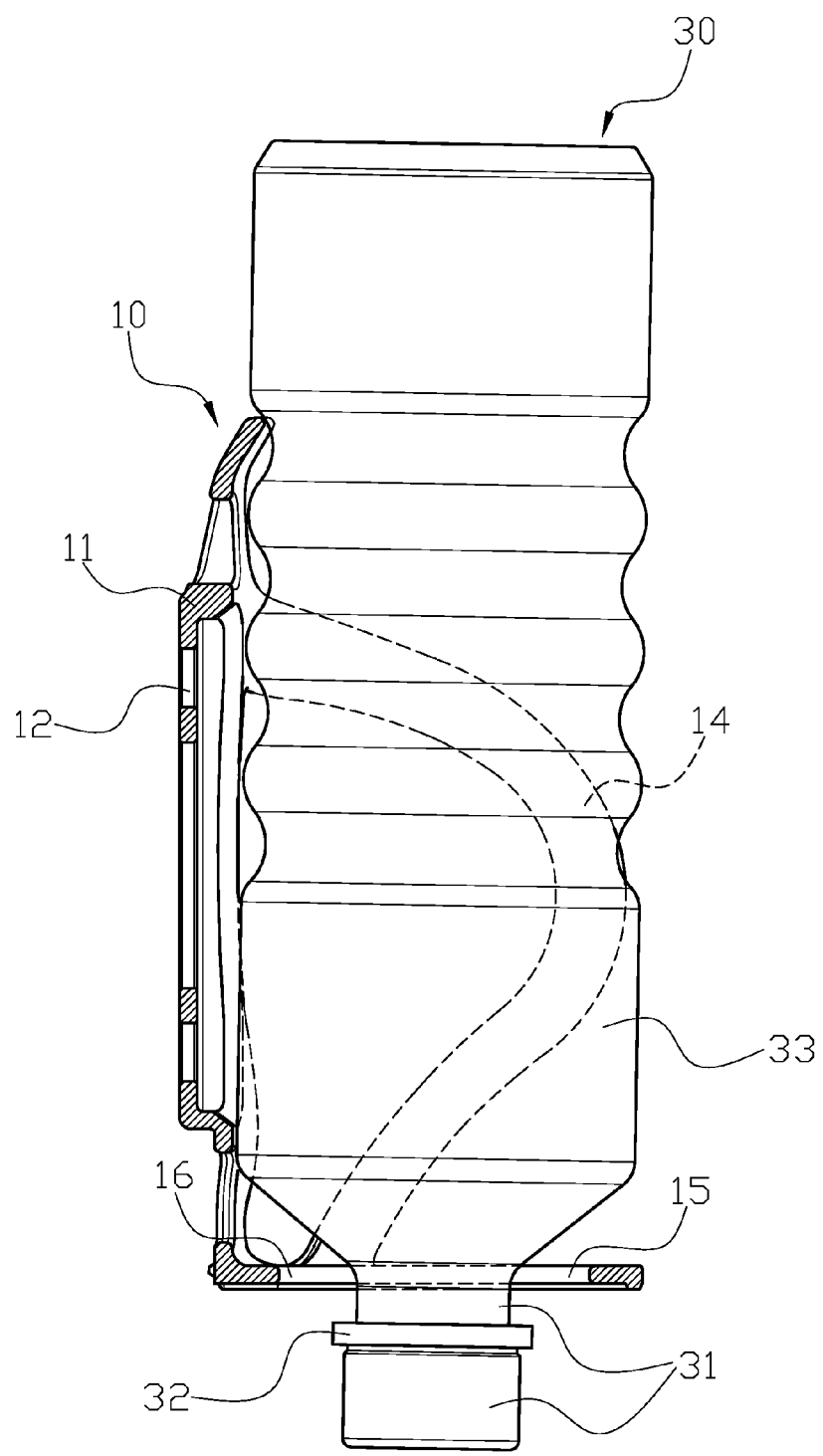
FIG. 8 is a schematic view of the present invention when the bottle holder provides a support frame for the PET bottle.

When in use, as shown in FIG. 4, a water bottle (20) is secured in the bottle holder (10) by the elastic portions (14) and the bottom thereof is supported by the supporting piece (13). Referring to FIGS. 5 to 8, when the water bottle is switched to a traditional PET bottle (30), the PET bottle (30) is inserted upside down into the bottle holder (10), and a bottle opening portion (31) and a collar portion (32) of the PET bottle (30) are inserted into the through hole (16) with a predetermined angle. By pushing a body portion (33) of the PET bottle (30) toward the supporting board (11), the bottle opening portion (31) and the collar portion (32) of the PET bottle (30) are moved toward the limited hole (15), and the enlarging collar portion (32) of the PET bottle (30) is blocked by the protruding edge (17) and a bottom of the limited hole (15) to prevent the PET bottle (30) from dropping during a bumpy riding process. The PET bottle (30) can be removed from the bottle holder (10) by pushing the body portion (33) of the PET bottle (30) away from the supporting board (11) to make the collar portion (32) of PET bottle (30) disengage with the protruding edge (17), and the PET bottle (30) can be pull out from the through hole (16) with the predetermined angle.

Comparing with conventional bottle holder, the present invention is advantageous because with the arrangement of the limited hole (15), the through hole (16), and the protruding edge (17) formed at a connecting portion of the limited hole (15) and the through hole (16) on each side thereof, the bottle holder (10) can be used for the water bottles, including traditional PET bottles (30), with different sizes. The bottle holder in the present invention can successfully prevent the water bottles with different sizes from falling out of the bottle holder (10) during the riding process.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bottle holder for a bicycle adapted to use for different sizes of bottles, comprising a supporting board having a screw hole configured to connect with a screw to secure the bottle holder on the bicycle, and a lower portion of the supporting board having a supporting piece connecting with an arc-shaped elastic portion on each of both sides of the supporting piece, wherein a limited hole and a through hole partially overlapped with each other are formed on the supporting piece, and the size of the through hole is larger than that of the limited hole, and a sharpened protruding edge is formed at a connecting portion of the limited hole and the through hole on each side thereof, wherein the limited hole and the sharpened protruding edge extending in the limited hole are configured to secured a bottle inserted into the limited hole, and each arc-shaped elastic portion extends downwardly from an upper portion of the supporting board to connect with an outer periphery of the through hole.

2. The bottle holder for a bicycle of claim 1, wherein the screw hole on the support board is rectangular.

* * * * *